United States Patent Office 3,396,110
Patented Aug. 6, 1968

3,396,110
LUBRICANT COMPRISING SULFUR-CONTAINING POLYMER
Harold Wayne Hill, Jr., and James T. Edmonds, Jr., Bartlesville, Okla., assignors to Phillips Petroleum Company, a corporation of Delaware
No Drawing. Filed Nov. 30, 1964, Ser. No. 414,854
13 Claims. (Cl. 252—42.1)

This invention relates to a method for the preparation of a lubricant composition. It also relates to a novel lubricant composition. In one of its aspects, the invention relates to the preparation of a sulfur containing polymer by the reaction of at least one polyhalo-substituted aromatic compound with an alkali metal sulfide in a polar organic compound reaction media and compounding the polymer thus obtained with other ingredients to prepare a lubricant composition. In other of its aspects, the invention relates to a lubricant composition having incorporated therein, in the preparation thereof, a sulfur containing polymer as herein described.

A wide variety of lubricants are used commercially, including greases, motor oils, gear oils, and the like. Many different types of additives are employed to provide lubricants of certain specific characteristics. For example, lithium soap greases are widely used in applications requiring stability. Various inorganic sulfides, such as molybdenum disulfide, have been used as additives for greases and other lubricants. However, at the present time, lubricants which are useful at the boundary of lubricating properties are not readily available. Such boundary lubricants include lubricants which are useful at high temperature and for the lubrication of machinery operating at high speeds. Under such conditions, the film of lubricant between moving parts of the machinery breaks down readily, and damage to the machinery occurs at a rapid rate.

One type of grease which has been developed which has improved lubricity and stability is described in Patent 3,112,270, issued Nov. 26, 1963. In that patent, improved lubricants containing dispersed ethylene polymers are described and claimed, said lubricants being milled in a narrow temperature range so as to provide greater work stability.

Ser. No. 327,143, filed Nov. 27, 1963 now U.S. Patent 3,354,129, issued Nov. 21, 1967, J. T. Edmonds and H. W. Hill, describes at least one method for the preparation of sulfur containing polymers, including polymers by the reaction of at least one polyhalo-substituted aromatic compound or polyhalo-substituted heterocyclic compound with an alkali metal sulfide in a polar organic compound reaction medium. The polymers resulting from this process are high melting, thermoplastic materials which have excellent high temperature stability.

We have now found that lubricants, especially boundary lubricants, can be prepared by incorporating into such a material a sulfur containing polymer having a molecular weight of at least 1000 prepared by the reaction of at least one polyhalo-substituted aromatic compound or polyhalo-substituted heterocyclic compound with an alkali metal sulfide in a polar organic reaction media as described in Ser. No. 327,143, above mentioned. The polymers now preferred have a molecular weight in excess of 1000, preferably above 2000 and more usually a molecular weight above 5000.

It is the object of this invention to provide new lubricants. It is a further object to provide lubricants which exhibit desirable characteristics for use as boundary lubricants.

Other aspects, objects and the several advantages of this invention will be apparent from a study of this disclosure and the appended claims.

According to the process of this invention, lubricant compositions useful at boundary conditions are prepared by formulating a base stock of such a material with a sulfur containing polymer, the polymer being prepared, preferably, as herein described and having a molecular weight above at least 1000, preferably above 2000 and higher, usually above 5000.

According to Ser. No. 327,143, sulfur containing polymers utilized in the present invention can be prepared by reacting at least one polyhalo-substituted aromatic compound with an alkali metal sulfide. The reaction is preferably carried out in a reaction medium comprising a polar organic compound which is a solvent for the reactants.

The alkali metal sulfides which are employed in the formation of the arylene sulfide polymers can be the monosulfides of sodium, potassium, lithium, rubidium, and cesium, including the anhydrous unhydrated forms of the sulfides. The preferred sulfide reactant is $Na_2S$ and its hydrates. The preferred reaction medium for this reaction is N-methylpyrrolidone. The reaction is generally carried out by contacting of a polyhalo-substituted aromatic compound with an alkali metal sulfide in a polar solvent at a temperature of from about 150° C. to 450° C., preferably from 200° C. to 350° C. The mol ratio of alkali metal sulfide to polyhalo-substituted aromatic compound usually will approximate 1:1.

The polyhalo-substituted aromatic compounds which can be employed as a primary reactant in the process of this invention are represented by the formulas:

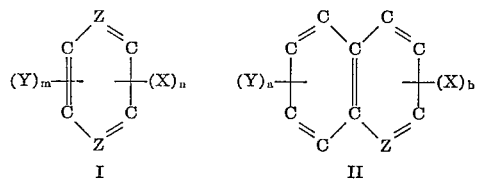

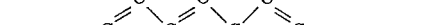

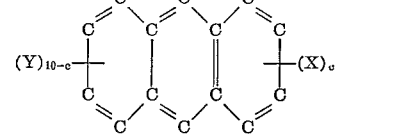

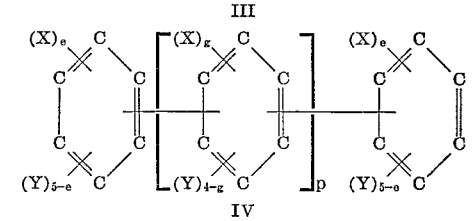

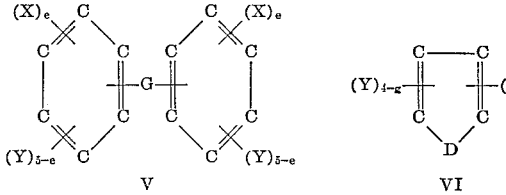

wherein each X is a halogen selected from the group consisting of chlorine, bromine, iodine, and fluorine, preferably chlorine and bromine, each Y is selected from the group consisting of hydrogen, —R, —N(R)$_2$, $$-\overset{O}{\underset{\|}{C}}-OR, \quad -\overset{O}{\underset{\|}{C}}-OM, \quad -\overset{O}{\underset{\|}{C}}-N(R)_2, \quad -\overset{R}{\underset{|}{N}}-\overset{O}{\underset{\|}{C}}-R'$$

—O—R', —S—R', —SO$_3$H and —SO$_3$M, wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S—, and

G is selected from the group consisting of

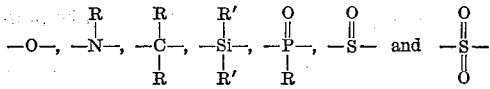

M is an alkali metal selected from the group consisting of sodium, potassium, lithium, rubidium, and cesium; $n$ is a whole integer of from 2 to 6, inclusive; when both Z's in Formula I are —C=, $m$ equals 6—$n$, when one Z in Formula I is —C=, $m$ equals 5—$n$, when both Z's in Formula I are —N=, $m$ equals 4—$n$; $b$ is a whole integer of from 2 to 8, inclusive, when Z in Formula II is —C=, $a$ equals 8—$b$, when Z in Formula II is —N=, $a$ equals 7—$b$; $c$ is a whole integer of from 2 to 10, inclusive, $e$ is a whole integer of from 1 to 5, inclusive, $g$ is a whole integer of from 2 to 4, inclusive, and $p$ is a whole integer selected from the group consisting of 0 and 1.

Some specific examples of polyhalo-substituted aromatic compounds of the above general formulas which can be employed in the process of this invention are:

1,2-dichlorobenzene
1,3-dichlorobenzene
1,4-dichlorobenzene
2,4-dichlorotoluene
2,5-dichlorotoluene
1,4-dibromobenzene
1,4-diiodobenzene
1,4-difluorobenzene
2,5-dibromoaniline
4,4'-dibromobiphenyl
N,N-dimethyl-2,5-dibromoaniline
1,3,5-trichlorobenzene
1,2,4-trichlorobenzene
1,2,4,5-tetrabromobenzene
hexachlorobenzene
1-n-butyl-2,5-dichlorobenzene
1-cyclohexyl-2,5-diiodobenzene
1-isooctyl-2,4-difluorobenzene
1-n-dodecyl-2,5-dichlorobenzene
1-benzyl-2,5-dibromobenzene
1,4-di-n-butyl-2,5-dichlorobenzene
1,4-di-n-nonyl-2,6-di-bromobenzene
1,3,5-trichloro-2,4,6-triphenylbenzene
1,4-dibromo-2,3,5,6-tetra(4-ethylphenyl)benzene
methyl-2,5-dichlorobenzoate
isopropyl 2,3,5-tribromobenzoate
cyclohexyl 2,4,6-triiodobenzoate
phenyl 2,3,4,5,6-pentachlorobenzoate
2,5-dichlorobenzoamide
N,N-di-n-dodecyl-2,4,5-tribromobenzoamide
ethyl 2,4,5-trichloroacetanilide
cyclohexyl N-methyl-2,5-dibrimoacetanilide
1-methoxy-2,5-dichlorobenzene
1-cyclohexylthio-2,5-dichlorobenzene
1,4-dibromonaphthalene
1,4-dichloro-7,8-diethylnaphthalene
1,4,7,8-tetrabromo-2,3,5,6-tetra-n-butylnaphthalene
1,3,5-trichloro-7-aminonaphthalene
n-octyl 2,4-dibromonaphthalene-1-carboxylate
N,N-dimethyl-5,6,7,8-tetrabromo-1-naphthalenecarboxamide
1-acetamido-2,4-dibromonaphthalene
8-decoxy-1,4-difluoronaphthalene
6,7-dibenzyl-8-methylthio-1,4-dichloronaphthalene.

In a further aspect of this case, the polymeric materials can be cured prior to incorporation into greases. Curing can be effected by the method described in the aforementioned copending application Ser. No. 327,143. Such methods include heat treatment in the presence or absence of oxygen, under vacuum, or at atmospheric or superatmospheric pressures, and is most usually carried out at a temperature above the melting point of the polymer being cured.

The polymers described above can be employed in a variety of lubricating compositions or materials. These lubricating compositions can range from motor oils, gear oils, cutting oils, to greases, etc. These lubricating compositions can comprise a mineral oil base, such as a conventionally refined crude oil lubricating stock having a viscosity in the range of 50 to 1500 SUS (100° F.). In addition to these natural base oils, synthetic base oils can also be used. These latter bases include polymerized olefins, copolymers of alkylene glycols and oxides, organic esters of polybase organic and inorganic acids, silicone polymers and the like. The additives of the present invention have particular application in grease compositions which comprise suitably refined mineral oils thickened by at least one agent such as metallic soaps, high molecular weight olefin polymers, carbon black, finely divided silica and the like.

One of the advantages of the polymeric grease additives of this invention is the very low particle size of the uncured polymer as obtained from the reactor in which it is formed. This small particle size simplifies the incorporation of the additive into grease stocks. The particle size of these uncured polymers is generally less than 100 microns and usually less than 10 microns. The cured polymers can be ground by any suitable means to provide polymeric material having a particle size less than 200 microns, preferably as low as the uncured polymers, which can be readily incorporated into grease stocks.

A particular type of grease which can be improved by the addition thereto of a finite amount of one of the above-described polymers are the greases described in said Patent No. 3,112,270, issued Nov. 26, 1963. According to that application, high molecular weight ethylene polymers are incorporated into a lubricating oil base, and the resulting dispersion is thereafter milled at a temperature within the range of from about 170 to 210° F. Such greases will contain from about 0.1 to about 20 weight percent ethylene polymer in the finished greases, and can contain from about 0.1 up to about 25 percent by weight of a lithium soap such as the lithium soap of 12-hydroxystearic acid.

The lubricants of the present invention usually will contain from about 0.1 to about 50 weight percent based on the total lubricant composition of one or more of the above-described polymers. It is recognized that, if very minor amounts of these sulfur containing polymers are employed, together with an oily base, the final composition can be oily in character. According to the invention, the arylene sulfide polymers can be employed as the sole thickening agent in a grease, in which case, amounts in the upper portion of the range, and even higher, can be utilized. The lubricant composition, in addition to the base stock and the polymer, can contain various other conventional additives such as thickeners, anti-oxidants, VI improvers, pour point depressants, corrosion inhibitors, detergents, foam inhibitors, and the like.

The lubricant compositions of the present invention are prepared by conventional techniques. For example, the base oil and the polymer are brought together in a mixing vessel. Other additives are also charged to this vessel, and for maximum convenience in mixing and subsequent lubricating effectiveness, the solid ingredients should be in a fine state of subdivision. Using constant agitation, the mixture is heated and blended at temperatures ranging from 100° F. to 500° F. for a period of time sufficient to obtain maximum homogeneity and effectiveness. The blend is then cooled to room temperature, although milling at an intermediate temperature between the formulation temperature and room temperature can be utilized for improving work stability of these lubricants.

Following are specific examples which are intended to illustrate several embodiments of the invention.

Example I

A lubricant was prepared containing polyphenylene sulfide prepared according to the present invention.

The polyphenylene sulfide (PPS) was prepared by charging a solution of 1 gram mol of sodium sulfide nonanhydrate in 1 liter of N-methylpyrrolidone to a vessel and heating to 190° C. with nitrogen flowing through the solution to remove the water of hydration. The resulting solution was charged to a stainless steel bomb together with 1 gram mol of p-dichlorobenzene. The bomb and contents were brought to a temperature of 565° F. in about 3 hours and then maintained at 560–570° F. for 3 more hours. The bomb was cooled, the contents filtered, and the finely divided solid polymer washed repeatedly and alternately with water and methanol. The solid polymer was then dried at 125° C. under vacuum. Four runs were carried out in an essentially identical manner and the finished product were blended. The resulting powdery material had a melting point of 280° C. and an ash content of 0.32 weight percent. Elemental analysis of this polymer showed 0.71 weight percent chlorine, 28.6 weight percent sulfur, 3.9 weight percent hydrogen, and 66.5 weight percent carbon.

The molecular weight of this polymer, as determined by the elevation of the boiling point of biphenyl, was 5500.

A commercial grease composition (Philube ASM) which consisted of 1 weight percent high density polyethylene, 9 weight percent lithium 12-hydroxystearate, the remainder being a 500 SUS (100 ° F.) conventionally refined neutral oil having a viscosity index of 89, was blended with 1 percent of the above prepared polyphenylene sulfide for 30 minutes, using a Hobart mixer. The resulting grease was then evaluated, using conventional grease tests. This grease was compared with the commercial grease not containing any of the polyphenylene sulfide. The results of these tests are shown below as Table I.

TABLE I

| Test | Commercial Grease | Commercial Grease+1 wt. Percent PPS |
|---|---|---|
| ASTM Penetration at 77° F. (D217–60T): | | |
| 0xx | 272 | 287 |
| 60xx | 273 | 279 |
| 104xx | 282 | 277 |
| Drop Point, ° F. (D566–42) | 391 | 392 |
| Water Washout at 175° F., Percent (D1264–53T) | 2.5 | 0.5 |
| FAFNIR, MG Commercial Apparatus | 106 | 43 |
| 4-Ball Wear, microns:[1] | | |
| 20 kg | 315 | 315 |
| 40 kg | 450 | 550 |
| 60 kg | 2,300 | 1,300 |
| 80 kg | 3,500 | 1,800 |
| 100 kg | 6,000+ | 1,750 |
| 120 kg | | 2,050 |
| 4-Ball Friction: | | |
| 40 kg | 0.067 | 0.017 |
| 60 kg | 0.056 | 0.073 |
| 80 kg | 0.060 | 0.064 |
| 100 kg | [2] 1.136 | 0.136 |
| 200 kg | | 0.050 |
| 300 kg | | 0.055 |
| 400 kg | | [3] 0.038 |

[1] Varying loads in kilograms, e.g., 20 kg. is 20 kilograms.
[2] Welded at 110 kg.
[3] Welded at 420 kg.

The 4-ball wear test was carried out using the Shell 4-ball tester, a conventional grease testing device (Precision Scientific Catalog #75015). In this test, three ½-inch diameter steel balls are fixedly mounted in a cup filled with the test grease (about 10 ml.). A fourth ball is mounted on a rotatable spindle in a position contacting the three fixed balls. The fourth ball is then rotated at 1800 r.p.m. for 1 minute under a variable load. After 1 minute, the apparatus is stopped, and additional weight is added to the load. After each 1 minute run, the wear on the three fixed balls is measured microscopically, averaged, and reported in terms of microns wear.

The 4-ball friction test is run using the 4-ball tester, except that the base is free to rotate on a bearing attached to a torque arm. The torque arm is attached to a recording device which records directly in coefficient of friction. After one minute at a given load, additional load is added in this friction test without stopping the machine. The load at which the balls weld together is considered the end of the test run.

In the above table, it can be seen that the grease of this invention, containing 1 weight percent of polyphenylene sulfide, was superior to the same grease containing no polyphenylene sulfide. The advantage of the grease of this invention is most clearly shown in the 4-ball friction test. This test is a high temperature test, the temperature being generated by the friction of the balls. It can be seen that thhe coefficients of friction in this test were much less for the grease containing polyphenylene sulfide.

In still another formulation, a grease was made containing 20 percent of the above-described polyphenylene sulfide and 80 percent of a 500 SUS (100° F.) mineral oil having a VI of 89. These materials were mixed together at room temperature. The resulting grease had an unworked penetration of 280, and a penetration after 60 strokes of 189. These penetrations were run by ASTM method D217–60T. The drop point for this grease (ASTM D566–42) was 500° F., while the Timken endurance results with this grease at a 10 pound load was 7 hours +. The procedure for carrying out this test is reported in detail in the NLGI Spokesman, volume XX, No. 9, page 36, December 1956.

A polymer was prepared by essentially the same procedure as described above. The molecular weight of this polymer was then determined by boiling point elevation.

Four mols of NaOH, 2 mols $H_2S$ and 1 mol of N-methyl-2-pyrrolidone were charged to a reactor and heated to form $Na_2S$ and drive off the water formed. At this time 1.98 mols of p-dichlorobenzene was added, and the resulting mixture was heated to 475° F. and maintained at this temperature for 3 hours. After cooling the reaction mixture, the polymer was recovered by filtration, washed and dried.

A sample of this polymer was dissolved in boiling biphenyl, and the boiling point elevation technique was employed to measure the molecular weight. The number average molecular weight was found to be approximately 12,000.

Example II

A low molecular weight polyphenylene sulfide containing mercaptan end groups was synthesized in the following manner:

One liter of N-methyl-2-pyrrolidone (NMP) and 720 grams of $Na_2S \cdot 9H_2O$ were charged to a reactor and heated while flushing with nitrogen to remove substantially all of the water of hydration. At this time, 441 grams of p-dichlorobenzene were charged to the reactor and heated for 13.5 hours at 450° F.–460° F. The polymer, after drying, weighed 300 grams and had a melting point of 297° C. It was a high molecular weight polymer.

This high molecular weight polymer was converted to a low molecular weight polymer by charging 108 grams of it, 1000 ml. NMP, 80 grams of NaOH and 34 grams of $H_2S$ to a reactor and heating the mixture to 500° F. for 5.5 hours. The reactor contents were then diluted with 500 cc. of water, after which 250 cc. of concentrated HCl were added. The mixture was then filtered and 45.2 grams of low molecular weight polymer, M.P. 100° C., were obtained. This polymer was recrystallized from a 50/50 n-heptane/xylene mixture, yielding 27.5 grams of polymer M.P. 125° C.–130° C. The calculated average molecular weight of this polymer from mercaptan analysis was 510. This polymer is indicated to have the structure.

The above prepared low molecular weight polymer was tested in grease by milling in 1 percent by weight of the polymer into the commercial grease of Example I, using the blending procedure of Example I.

The commercial grease containing the low molecular polymer was tested in the wheel bearing test, ASTM D1263–61 using a weight of 130 grams and a temperature of 260° F. The invention grease of Example I was also tested by this procedure.

| Test | Grease Loss, grams | |
|---|---|---|
| | Commercial Grease plus 1 wt. percent low molecular wt. polymer | Commercial Grease plus 1 wt. percent of high molecular wt. polymer (Ex I) [1] |
| ASTM 1263–61 (130 grams, 260° F.) | 25.0 (fail) | 10.6 (pass). |
| Bomb oxidation stability, ΔP, p.s.i. after 500 hrs. (ASTM D–942). | 38.0 [2] | Not det. |

[1] Same polymer tested in grease in Example I.
[2] For comparison, see table, Example IV.

Example III

A series of tests was carried out in which a commercial grease was formulated with sulfur containing polymers according to this invention and thereafter tested for oxidation stability.

One polymer (polymer A) was prepared by mixing 1 liter NMP and 480.4 grams $Na_2S \cdot 9H_2O$ and heating the resulting mixture to 190° F. while flushing with $N_2$ to remove water of hydration. After 380 ml. (water and NMP) were taken off overhead, the remaining material was mixed with 294 grams of p-dichlorobenzene and 16 grams 2,4-dichlorotoluene. This mixture was heated to 300° C., requiring 2 hours, and maintaining at 300° C. for 3 hours. The reaction mixture was cooled and the solid polymer was recovered by filtration. This polymer was washed twice with 1.5 liters of benzene in each wash, and 3 times with 1.5 liters of $H_2O$ (each wash). After drying at 125° C. overnight in a vacuum oven, the polymer weighed 194 grams, M.P. 268° C.

The second polymer (polymer B) was prepared in the following manner. One liter NMP and 720 grams $Na_2S \cdot 9H_2O$ were heated to 190° C. while flushing with $N_2$ to remove water of hydration. The remaining material was mixed with 485 grams p-dichlorobenzene and heated for 17 hours at 450° F.–460° F. The reaction temperature was then raised to 500° F.–560° F. for 2.5 hours. After cooling and filtering, the polymer was washed 3 times, using 2 liters of NaOH followed by 2 liters of water in each wash. After drying, the polymer weighed 298 grams.

The commercial grease of Example I was blended with the above polymers to provide one sample containing 1 weight percent polymer A and one sample containing 1 weight percent polymer B. Oxidation stability of these grease samples was then determined by ASTM D–942 and compared to the oxidation stability of the commercial grease containing no sulfur containing polymer.

Grease sample: ΔP, p.s.i. at 240 hours
Commercial grease _____ 6.5
Commercial grease plus 1 wt. percent A _____ 8.0
Commercial grease plus 1 wt. percent B _____ 5.0

Example IV

In another run, a polymer was formed by the reaction of a major amount of p-dichlorobenzene and a minor amount of 1,2,4-trichlorobenzene with sodium sulfide. The resulting polymer was then blended into a grease in the manner of Example I and tested.

In this run, 480 grams $Na_2S \cdot 9H_2O$ mixed with 1 liter of NMP and heated to reflux while flushing with $N_2$ to remove substantially all of the water of hydration. To the resulting mixture was added 274.6 grams p-dichlorobenzene and 24.2 grams of 1,2,4-trichlorobenzene. The resulting mixture was heated to 485° F.–505° F. and maintained at this temperature for 3 hours. The reaction mixture was then cooled and the polymer was separated by filtration. The polymer was then washed once with 1 liter NaOH and 6 times with distilled water, using approximately 1 liter in each wash. The polymer was dried and subsequently reslurried in 1 liter of water and heated to 400° F. for 2 hours. The polymer was then washed twice with $H_2O$ (1 liter each wash) and twice with acetone (1 liter each wash). This polymer had an M.P. of 244° C. and a particle size range of 8–50 microns, with most of the polymer at 15 microns.

A portion of the above-prepared polymer was milled into a lithium soap grease to provide a grease composition containing 3 percent by weight of the polymer. The grease into which the polymer was milled was formed by milling approximately 12 weight percent of mixed lithium soaps of mixed $C_{14}$ to $C_{22}$ even numbered acids, including some 12-hydroxy stearate, into a base oil of about 75 SUS at 210° F. The resulting grease was then evaluated by conventional grease tests.

| | Commercial Lithium Base Grease | Commercial Lithium Base Grease plus 3 wt. percent Polymer |
|---|---|---|
| ASTM Penetration at 77° F. (D217–60T): | | |
| 0xx | | 256 |
| 60xx | | 256 |
| Drop Point, ° F. (D566–42) | | 375 |
| 4-Ball Wear, microns (See Example I): | | |
| 20 kg | 175 | |
| 40 kg | 240 | |
| 60 kg | 330 | |
| 80 kg | 1,030 | 399 |
| 100 kg | 1,260 | |
| 120 kg | Welded | 849 |
| 140 kg | | 849 |
| 160 kg | | 1,248 |
| 180 kg | | |
| 200 kg | | Welded |
| | Low Molecular wt. Polymer of Example II | |
| Bomb oxidation stability ΔP in p.s.i. after 500 hours ASTM D–942 | 38 | 15 |

Example V

A run was carried out in which poly(biphenylene sulfide) was prepared and utilized as a thickener for a fluorosilicone fluid to form a grease.

The poly(biphenylene sulfide) was prepared in the following manner. One liter of NMP and 240.2 grams sodium sulfide nonahydrate were heated until 215 ml. of water and NMP distilled overhead. This mixture was then charged to a bomb along with 312 grams of 4,4'-dibromobiphenyl. The resulting mixture was heated to 300° C. and maintained at this temperature for 3 hours. The polymer was recovered by cooling and filtering, after which the polymer was washed 5 times with one liter water in each wash. After drying, 184 grams of dry polymer, M.P. 413° C., was obtained.

Fluorosilicone fluid (Dowing-Corning FS 1265) was thickened by the addition of 20 percent by weight, based on the fluorosilicone fluid, of the above polymer while stirring and heating. The unworked penetration of this grease was 354, and, after working 60 strokes, the product had stiffened to 330. The drop point of this grease was 635° F.

Example VI

Two polymerization runs were carried out in which fillers were added to the polymerization zone. The resulting filled sulfur containing polymers were then added to base stocks to form greases.

In one polymerization run, a mixture of 1 liter NMP and 720.6 grams $Na_2S \cdot 9H_2O$ was distilled until 520 grams of material were removed overhead. This mixture was then charged to a bomb along with 441 grams of p-dichlorobenzene and 100 grams graphite powder. This mixture was then rocked on a rocker for 17 hours at 440° F., after which the polymer was removed and washed 5 times with 2 liters of water (each wash) and one time with 2 liters of methanol. The dried polymer contained a homogeneous dispersion of graphite and is referred to herein as polymer C.

The above run was repeated except that the amount of overhead was 480 grams from the drying step, and 485 grams of p-dichlorobenzene and 30 grams of $MoS_2$ (instead of the graphite) were added to the reaction zone. The recovered polymer, referred to herein as polymer D, amounted to 344 grams and contained dispersed $MoS_2$.

The above prepared polymers were employed as thickeners by adding 10 percent by weight to a paraffinic lubricant stock to form a grease. The greases were then tested in conventional grease tests. The results of these tests are expressed below as a table:

| Polymer | Milled in Roll Mill at Room Temperature | Drop Point, °F. | ASTM Penetration at 77° F. 0xx | ASTM Penetration at 77° F. 60xx | 4-Ball Wear [1] at 80 kg., microns |
|---|---|---|---|---|---|
| C | No | 552 | 324 | 324 | 730 |
| C | Yes | 552 | 249 | 290 | 750 |
| D | No | (²) | 271 | 294 | 700 |
| D | Yes | 560 | 298 | 313 | 650 |

[1] See Example I for description of test.
² Not determined.

The polymers obtained upon reaction as herein discussed and as exemplified with dichlorobenzene and $Na_2S$ can be considered to have the following distinguishing structural characteristics.

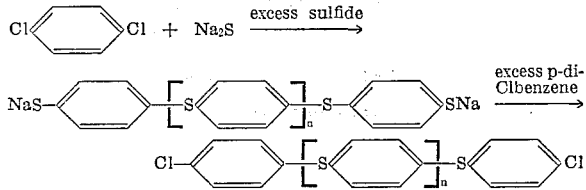

Example VII

A series of runs was carried out in which p-(phenylene sulfide) was prepared by the reaction of sodium sulfide and poly-dichlorobenzene, after which the polymer was cured and incorporated into grease.

A series of 5 runs was carried out in which polymer was prepared. In each run, 727.8 grams of $Na_2S$ nonahydrate and 1 liter of N-methyl-2-pyrrolidone were charged to a 3 liter flask and heated until 500-565 grams of water had been removed overhead. The resulting solution was then charged to a 3 liter bomb that had been cooled in an ice bath, and 441 grams of p-dichlorobenzene was added. The bomb was then sealed and heated to 475-530° F. and maintained at this temperature for 2 hours. The bomb was then cooled and opened and the polymer was recovered by filtration. Polymer was washed 4 times with water, filtering after each wash. A final wash with methanol was then used, after which the polymer was dried.

Each of the above-prepared polymers was refluxed in acetic acid overnight and dried. Four of the samples were cured by heating at 365° C. for 3 hours at 0.5-1 mm. Hg abs., while the remaining sample was cured by heating at 365° C. for 3.5 hours at 0.5-1 mm. Hg abs. These samples were then composited.

The composite of cured polymer was then ground in a Wiley mill, after which the composite material was swelled in a large excess of Arochlor 1248 (a chlorinated biphenyl) using approximately 200 grams of polymer/0.75 gallon of Arochlor. The resulting suspension was heated to 290° C. while swelling, after which the swollen polymer was recovered by filtration and washed with acetone. The polymer was then continuously extracted in a Soxhlet extractor for 2 hours with reflux acetone. This polymer was then dried at 85° C. and 150 mm. Hg absolute pressure overnight. This material was then strained through a sieve, yielding 25-30 grams of material having a particle size of 44 microns or less. The material larger than 44 microns was run through a micro pulverizer and strained again, yielding 60 grams of 74-199 micron material, 28 grams of 44-74 micron material and 37 grams of material having a particle size less than 44 microns.

Two samples of the above-prepared, finely divided, cured poly(phenylene sulfide) was incorporated into the commercial lithium base grease of Example IV, to provide a grease containing 3 percent by weight poly(phenylene sulfide). The following table shows the results of several tests to which this polymer-containing grease was subjected.

TABLE

|  | 74-149 micron size polymer | 44 micron size polymer |
|---|---|---|
| Bomb Oxidation, p.s.i., 500 hours (ASTM D942) | 15 | 15 |
| Drop Point, °F. (ASTM D566-42) | 355 | 363 |
| Penetration (ASTM D217-60T): |  |  |
| 0xx | 249 | 249 |
| 100xx | 257 | 260 |

Reasonable variation and modification are possible within the scope of the foregoing disclosure and the appended claims to the invention the essence of which is that a sulfur containing polymer, preferably prepared as herein described, has been incorporated into a lubricant composition, the said composition having been found to exhibit greatly improved properties due to the addition of the said polymer.

We claim:

1. A grease composition having incorporated therein a high molecular weight polyphenylene sulfide prepared by reacting sodium sulfide, from which substantially all water of hydration has been removed, dissolved in a polar organic solvent with p-dichlorobenzene at an elevated temperature until a finely divided solid polymer is obtained said composition not containing any metal dithiocarbamate.

2. A grease composition according to claim 1, said composition also containing a small amount of a high density polyethylene, a small amount of lithium 12-hydroxystearate, and a conventionally refined neutral oil used in the preparation of a grease, said composition not containing any metal dithiocarbamate.

3. A grease composition comprising at least one grease base oil having incorporated therein a minor amount of a sulfur containing high molecular weight polymer prepared by reacting at least one polyhalo-substituted aromatic compound with an alkali metal sulfide in a polar organic compound which is a solvent for the reactants, the polyhalo-substituted aromatic compound being selected from the group of compounds having the following structural characteristics:

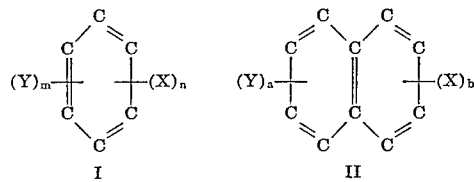

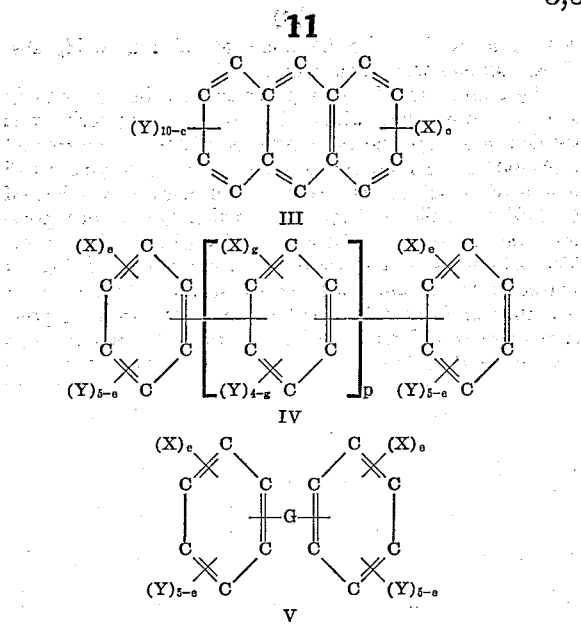

wherein each X is a halogen selected from the group consisting of chlorine, bromine, iodine, and fluorine, preferably chlorine and bromine; each Y is selected from the group consisting of hydrogen and alkyl, cycloalkyl, aryl, aralkyl, and alkaryl radicals containing from 1 to 12 carbon atoms, inclusive; G is selected from the group consisting of

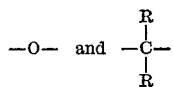

where R is the same as Y, defined above; $n$ is a whole integer of from 2 to 6, inclusive; $m$ equals $6-n$; $b$ is a whole integer of from 2 to 8, inclusive; $a$ equals $8-b$; $c$ is a whole integer of from 2 to 10, inclusive; $e$ is a whole integer of from 1 to 5, inclusive; $g$ is a whole integer of from 2 to 4, inclusive; and $p$ is a whole integer selected from the group consisting of 0 and 1; said grease composition not containing any metal dithiocarbamate.

4. A grease composition according to claim 3 wherein the alkali metal sulfide is dissolved in a solvent, substantially all water of hydration is removed, and the reaction between the alkali metal sulfide and the polyhalo-substituted aromatic compound is effected at a temperature in the range of from about 150° C. to about 450° C.

5. A method for the prepartion of a grease composition which comprises reacting at least one polyhalo-substituted aromatic compound with an alkali metal sulfide in a polar organic compound which is a solvent for the reactants, the polyhalo-substituted aromatic compound being selected from a group of compounds having the structural characteristics of Formula I and Formula II, recovering a polymer having a molecular weight of at least about 1000, and dispersing said polymer into a grease base stock said composition not containing any metal dithiocarbamate.

6. A method according to claim 5 wherein the reaction is effected at a temperature in the range of from about 150° C. to about 450° C. and the molecular weight of the polymer is at least about 2000.

7. A method according to claim 5 wherein the reaction is effected at a temperature in the range of from about 150° C. to about 450° C. and the molecular weight of the polymer is at least about 5000.

8. A composition according to claim 1 wherein the solvent is N-methyl-2-pyrrolidone.

9. A composition according to claim 3 wherein the solvent is N-methyl-2-pyrrolidone.

10. A composition according to claim 5 wherein the solvent is N-methyl-2-pyrrolidone.

11. The composition of claim 3 wherein said polymer has a molecular weight of at least about 1,000.

12. The composition of claim 3 wherein said polymer comprises from about 0.1 to about 50 weight percent of the total grease composition.

13. The composition of claim 3 wherein said polyhalo-substituted aromatic compound is selected from p-dichlorobenzene, 2,4-dichloroetoluene, 1,2,4-trichlorobenzene, 4,4'-dibromobiphenyl, and mixtures thereof.

References Cited

UNITED STATES PATENTS

| 3,098,103 | 7/1963 | Reifechneider | 252—45 |
| 3,112,270 | 11/1963 | Mitacek et al. | 252—41 |
| 3,248,325 | 4/1966 | Graham | 252—45 |
| 3,268,504 | 8/1966 | Harris et al. | 260—79 |

DANIEL E. WYMAN, Primary Examiner.

I. VAUGHN, Assistant Examiner.